Figure 1:
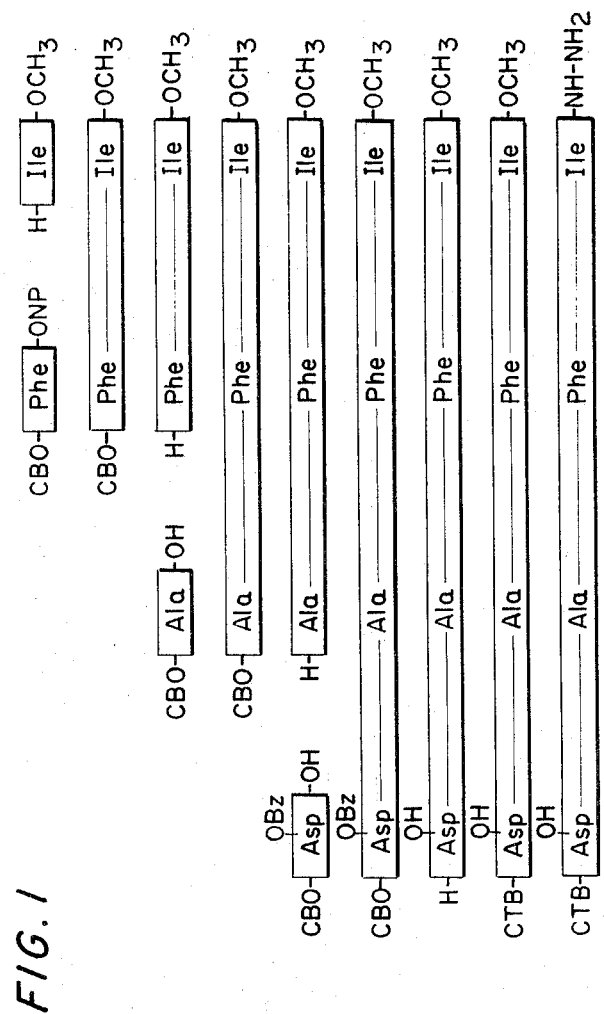
Figure 2:
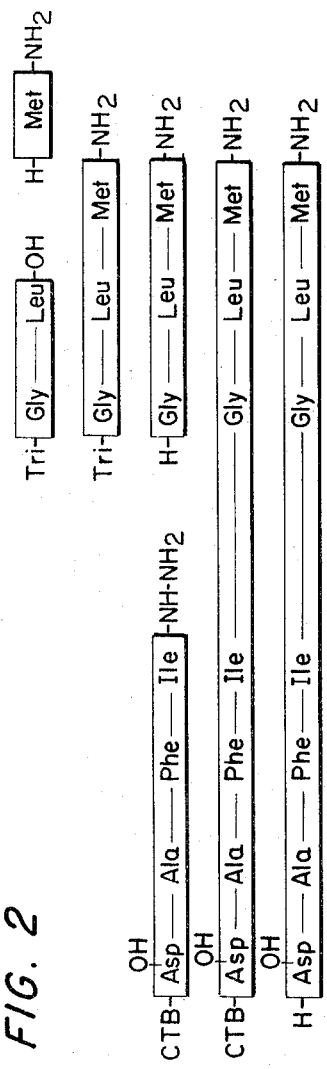
Figure 3:
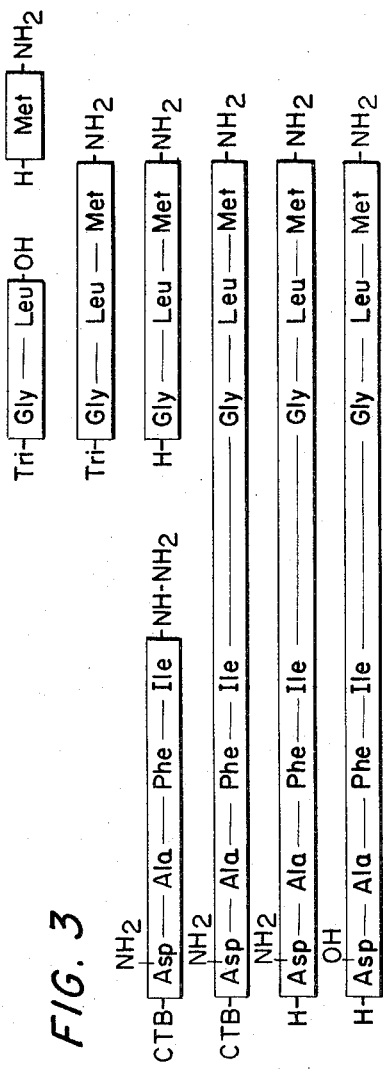

United States Patent Office 3,299,035
Patented Jan. 17, 1967

3,299,035
L-ASPARTYL-L-ALANYL-L-PHENYLALANYL-L-ISOLEUCYL-GLYCYL-L-LEUCYL-L-METHIONINAMIDE AND ITS ACID ADDITION SALTS
Roger Boissonnas, Bottmingen, Basel-Land, and Edmond Sandrin, Basel, Switzerland, assignors to Sandoz Ltd. (also known as Sandoz A.G.), Basel, Switzerland, a Swiss firm
Filed July 11, 1962, Ser. No. 209,810
Claims priority, application Switzerland, July 14, 1961, 8,264/61
3 Claims. (Cl. 260—112.5)

The present invention relates to a new heptapeptide and to a process for its production.

The present invention comprises the heptapeptide L-aspartyl - L - alanyl-L-phenylalanyl-L-isoleucyl-glycyl-L-leucyl-L-methionine amide, its acid addition salts and pharmaceutical compositions containing, in addition to an inert carrier, a therapeutically effective amount of said heptapeptide and/or an acid addition salt thereof.

The present invention further resides in procedure for the production of the above-mentioned heptapeptide and its acid addition salts, characterized in that a tetrapeptide, L-aspartyl-L-alanyl-L-phenylalanyl - L - isoleucine, having a protective group on the amino radical and, optionally, on the β-carboxyl radical of the aspartic acid radical and, optionally, a group reactive with amino radicals on the carboxyl radical of the isoleucine radical, is condensed with glycyl-L-leucyl-L-menthionine amide and the protective radical or protective radicals is or are removed from the resulting protective group- or groups-containing heptapeptide in one or more steps and, when an acid addition salt is required, salification is effected in manner known per se with a suitable inorganic or organic acid.

It is also within the scope of the present invention to obtain the said heptapeptide from the protective group-containing heptapeptide by removing the protective group or groups in one or more steps. The removal of the protective group or groups is effected in manner known per se. The term "known" as used herein designates a method described in the literature on the subject or in actual use.

Examples of acids suitable for salifying the heptapeptide of the invention are hydrochloric, hydrobromic, sulphuric, citric, tartaric, succinic, maleic, malic, acetic, benzoic, hexahydrobenzoic, methanesulphonic, fumaric, gallic and hydriodic acids.

Examples of radicals which are useful as protective groups for the amino radical of the aspartic acid radical are the carbobenzoxy, toluenesulfonyl, trifluoroacetyl, phthalyl, formyl, carbo-tert.-butoxy and p-nitro-carbobenzoxy radicals. Examples of radicals which are used as protective groups for the β-carboxyl radical of the aspartic acid radical are the benzyl, p-nitrobenzyl, methyl, ethyl, tert.-butyl and amido radicals. Examples of groups in the tetrapeptide, which groups are reactive with the amino radical in the end position of the tripeptide, are azide, p-nitrophenyl and 2,4,5-trichlorophenyl ester radicals. An asymmetric anhydride of the tetrapeptide or the reaction product of the tetrapeptide with dicyclohexylcarbodiimide is likewise reactive with said amino radical and hence suitable for use in the process of the invention.

The heptapeptide of the invention and the L-asparaginyl - L - alanyl - L - phenylalanyl-L-isoleucyl-glycyl-L-lecuyl-L-methionine amide and their acid addition salts have pharmaceutical properties. They show marked vascular activity useful in controlling organic and functional changes in the arteries, especially in the periphery. These two substances cause a general enlargement of the blood vessels, especially in the case of spastic conditions of the arterioles and the resulting excess pressure in the arterial branch of the vascular system. Said substances have properties which are useful in combating functional blood circulation disorders of the brain in the case of strokes and migraine and for the opening of collaterals in vascular blockages in the brain. Said substances further have properties useful for paralyzing the vascular system during surgical operations and combating the lack of oxygen in the heart muscle by increasing the blood flow.

The heptapeptide of the invention and its salts may also be used as intermediate compounds in the production of pharmaceuticals. Thus, for example, the hypotensive hendecapeptide, L-pyroglutamyl-L-prolyl-L-seryl-L - lysyl-L-aspartyl-L-alanyl-L-phenylalanyl-L-isoleucyl-glycyl-L-leucyl-L-methionine amide, can be produced as described in application Serial No. 209,811 from the heptapeptide of the present invention.

The new heptapeptide can be synthesized in a variety of ways as illustrated in the accompanying diagrammatic drawings wherein certain abbreviations are used the meanings of which are set forth below.

In one such synthesis, N-carbobenzoxy-L-phenylalanine-p-nitrophenylester is condensed with L-isoleucine-methylester, the carbobenzoxy radical split off and the resulting dipeptide ester condensed with N-carbobenzoxy-L-alanine. The resulting tripeptide ester is condensed with N-carbobenzoxy-L-aspartic acid β-benzyl-ester after splitting off the carbobenzoxy radical. After splitting off the carbobenzoxy and the benzyl radicals, the resulting free tetrapeptide ester is reacted with tert.-butyl-p-nitrophenyl carbonate. The resulting N-carbo-tert.-butoxy-L-aspartyl - L - alanyl-L-phenylalanyl-L-isoleucine-methylester is converted to the corresponding azide via the corresponding hydrazide (see FIG. I). The azide is then condensed with glycyl-L-leucyl-L-methionine amide obtained by condensation of N-trityl-glycyl-L-leucine with L-methionine amide and splitting off the trityl radical. The resulting heptapeptide amide is converted to L-aspartyl - L - alanyl-L-phenylalanyl-L-isoleucyl-glycyl-L-leucyl-L-methionine amide by treatment with trifluoroacetic acid (see FIG. II).

Another method of obtaining the heptapeptide of the invention is as follows: N-carbobenzoxy-L-alanyl-L-phenylalanyl-L-isoleucine-methylester is condensed with N-carbobenzoxy-L-asparagine p-nitrophenyl ester. After splitting off the carbobenzoxy radical, the resulting free tetrapeptide ester is reacted with tert.-butyl-p-nitrophenyl carbonate. The resulting N-carbo-tert.-butoxy-L-asparaginyl-L-alanyl-L-phenylalanyl-L-isoleucine - methylester is converted to the azide via the hydrazide (see FIG. III). The azide is condensed with glycyl-L-leucyl-L-methionine amide which is obtained by condensation of N-tritylglycyl-L-leucine with L-methionine amide and splitting off the trityl radical. The resulting heptapeptide is converted to L-asparaginyl-L-alanyl-L-phenylalanyl-L-isoleucyl-glycyl-L-leucyl-L-methionine amide by treatment with trifluoroacetic acid and the amide radical of the asparagine is then converted to the carboxyl radical (see FIG. III).

In the following non-limitative example all temperatures are given in degrees centigrade. Procedure 1 relates to the production of N-carbobenzoxy-L-alanyl-L-phenylalanyl-L-isoleucine-methylester (see FIG. I), procedure 2 to the production of N-carbo-tert.-butoxy-L-aspartyl-L-alanyl-L-phenylalanyl-L-isoleucine hydrozide (see FIG. I), procedure 3 to the production of L-aspartyl-L-alanyl-L - phenylalanyl-L-isoleucyl-glycyl-L-leucyl-L-methionine amide (see FIG. II), procedure 4 to the production of N - carbo - tert.-butoxy-L-asparaginyl-L-alanyl-L-phenylalanyl-L-isoleucine hydrazide, procedure 5 to the production of L-asparaginyl-L-alanyl-L-phenylalanyl-L-isoleucyl-glycyl-L-leucyl-L-methionine amide and procedure 6 to the production of L-aspartyl-L-alanyl-L-phenylalanyl-L-isoleucyl-glycyl-L-leucyl-L-methionine amide (see FIG. III).

The following abbreviations are used in the specification and drawings:

H–Asp(OH)–OH=L-aspartic acid
H–Ala–OH=L-alanine
H–Phe–OH=L-phenylalanine
H–Ile–OH=L-isoleucine
H–Gly–OH=glycine
H–Leu–OH=L-leucine
H–Met–NH₂=L-methionine amide
CBO=carbobenzoxy
CTB=carbo-tert.-butoxy
Tri=trityl
ONP=p-nitro-phenyloxy
OMe=methoxy
OBz=benzyloxy

Example

Procedure 1: (see FIG. I) CBO–Ala–Phe–Ile–OCH₃

168 g. of CBO–Phe–ONP and 58 g. of H–Ile–OCH₃ are dissolved in 1000 cc. of chloroform, the mixture is left to stand overnight at 20°, washed with water, dilute hydrochloric acid and aqueous sodium bicarbonate, dried over sodium sulphate, evaporated in a vacuum and ethyl ether added to the residue. 130 g. of CBO–Phe–Ile–OCH₃ (melting point 106°), crystallize and this is dissolved in 1100 cc. of a 3.5 N solution of hydrogen bromide in glacial acetic acid. After 1 hour at 20° the mixture is evaporated in a vacuum, ethyl ether added, the crystalline product dissolved in 600 cc. of chloroform and 48 cc. of triethylamine, 72 g. of dicyclohexyl-carbodiimide and 68 g. of CBO–Ala–OH are added. The mixture is left to stand overnight at 0°, filtered, the solution washed with water, dilute hydrochloric acid and aqueous sodium bicarbonate, the mixture dried over sodium sulphate, evaporated in a vacuum and ethyl ether added to the residue. 132 g. of CBO–Ala–Phe–Ile–OCH₃ (melting point 152°; $[\alpha]_D^{20}=-20°$ in 95% acetic acid) crystallize.

Procedure 2: (see FIG. I) CTB–Asp(OH)–Ala–Phe–Ile–NH–NH₂

132 g. of CBO–Ala–Phe–Ile–OCH₃ are dissolved in 1500 cc. of a 3.5 N solution of hydrogen bromide in glacial acetic acid, the mixture left to stand at 20° for 1 hour, evaporated in a vacuum, ethyl ether added, the crystallized compound dissolved in 1200 cc. of chloroform, 95 g. of CBO–Asp–(OBz)–OH, 37 cc. of triethylamine and 60 g. of dicyclohexyl-carbodiimide added. The mixture is left to stand overnight at 0°, filtered, the solution washed with water, dilute hydrochloric acid and aqueous sodium bicarbonate, the mixture is dried over sodium sulphate, evaporated in a vacuum and ethyl ether added to the residue. 140 g. of tetrapeptide (melting point 135°, decomposition; $[\alpha]_D^{21}=-24°$ in 95% acetic acid) crystallize, this is dissolved in 1600 cc. of 90% methanol and hydrogenated at 20° and normal pressure in the presence of a palladium catalyst so as to split off the carbobenzoxy and the benzyl radicals. The mixture is filtered, evaporated in a vacuum, dissolved in 1200 cc. of dimethyl formamide and 28 cc. of triethylamine and 200 g. of tert.-butyl-p-nitro-phenyl-carbonate are added. The mixture is evaporated in a vacuum after standing for 40 hours at 20°, dissolved in ethyl acetate, washed with dilute acetic acid, dried over sodium sulphate, evaporated in a vacuum and ethyl ether added. 93 g. of CTB–Asp(OH)–Ala–Phe–Ile–OCH₃ (melting point 120°, decomposition; $[\alpha]_D^{21}=-55°$ in methanol( crystallize and a solution of 250 g. of hydrazine hydrate in 1000 cc. of methanol is added hereto. After 4 days at 20° the mixture is evaporated in a vacuum, the residue dissolved in 300 cc. of water, brought to a pH value of 4.5 with 4 N hydrochloric acid, cooled to 0° and filtered. 73 g. of CTB–Asp(OH)–Ala–Phe–Ile–NH–NH₂ (melting point 220°, decomposition), result, $[\alpha]_D^{21}=-62°$ in methanol.

Procedure 3: H–Asp(OH)–Ala–Phe–Ile–Gly–Leu–Met–NH₂ (see FIG. II)

129 g. of Tri–Gly–Leu–OH, 45 g. of H–Met–NH₂ and 65 g. of dicyclohexylcarbodiimide are dissolved in 1300 cc. of methylene chloride, left to stand overnight at 0°, filtered, the solution washed with dilute hydrochloric acid and an aqueous sodium bicarbonate solution, dried over sodium sulphate, evaporated in a vacuum and ethyl ether added. 112 g. of Tri–Gly–Leu–Met–NH₂ (melting point 212°; $[\alpha]_D^{21}=-4°$ in dimethyl formamide) result and this is left to stand in a mixture of 600 cc. of glacial acetic acid and 600 cc. of water for 20 minutes at 90°, the mixture cooled to 20° and filtered; the solution is evaporated in a vacuum, the residue washed with ethyl ether and crystallized from methanol/ether. 62 g. of H–Gly–Leu–Met–NH₂ acetate (melting point 130°, decomposition; $[\alpha]_D^{21}=-35°$ in 95% acetic acid) result and a solution, prepared by dissolving 95 g. of CTB–Asp(OH)–Ala–Phe–Ile–NH–NH₂ in 400 cc. of 2 N hydrochloric acid and 600 cc. of dimethyl formamide at −5° and adding thereto 85 cc. of 2 N sodium nitrite and after 5 minutes 163 cc. of triethylamine and 600 cc. of dimethyl formamide is added. The mixture is left to stand overnight at 0°, evaporated in a vacuum, the residue washed with cold, dilute hydrochloric acid, dissolved in tetrahydrofuran and precipitated by the addition of water. 92 g. of CTB–Asp(OH)–Ala–Phe–Ile–Gly–Leu–Met–NH₂ (melting point 245°; $[\alpha]_D^{21}=-35°$ in dimethyl formamide) result and are dissolved in 2000 cc. of trifluoro acetic acid and left to stand at 28° for 1 hour. The solution is evaporated in a vacuum, dissolved in methanol, 16 cc. of tri-n-butyl amine are added and the solution made to precipitate by the addition of ethyl ether. 77 g. of H–Asp(OH)–Ala–Phe–Ile–Gly–Leu–Met–NH₂ result. (Melting point 265° decomposition) $[\alpha]_D^{22}=-36°$ in 95% acetic acid.

Procedure 4: CTB–Asp(NH₂)–Ala–Phe–Ile–NHNH₂

132 g. of CBO–Ala–Phe–Ile–OCH₃ in 1500 cc. of a 3.5 N solution of hydrogen bromide in glacial acetic acid is left to stand at 20° for 1 hour, evaporated in a vacuum, ethyl ether added, the crystallized product dissolved in 1000 cc. of tetrahydrofuran and 55 cc. of tri-n-butylamine, 90 g. of CBO–Asp(NH₂)–ONP are added, the mixture is stirred for 3 days at 20°, evaporated, dissolved in ethyl acetate, washed with water, dilute hydrochloric acid and aqueous sodium bicarbonate, dried over sodium sulphate, evaporated in a vacuum and recrystallized from ethanol. 98 g. of tetrapeptide (melting point 245°, with decomposition; $[\alpha]^{21}=-24°$ in 95% acetic acid) result, which is dissolved in 2000 cc. of a 3.5 N solution of hydrogen bromide in glacial acetic acid and left to stand for 1 hour at 20°. The mixture is evaporated in a vacuum, ethyl ether added, the crystalline product dissolved in 500 cc. of dimethyl formamide and 25 cc. of triethylamine and 130 g. of tert.-butyl-p-nitrophenyl carbonate are added. After 40 hours at 20° the mixture is evaporated in a vacuum, dissolved in ethyl acetate, washed with dilute acetic acid, dried over sodium sulphate, evaporated in a vacuum and ethyl ether added. 65 g. of CTB–Asp(NH₂)–Ala–Phe–Ile–OCH₃ (melting point 189°;

$$[\alpha]_D^{21}=-27°$$

in 95% acetic acid crystallized and a solution of 240 cc. of hydrazine hydrate in 900 cc. of methanol is added thereto. After three days at 20° the mixture is evaporated in a vacuum, the residue washed with water, dried and recrystallized from methanol/ethyl ether. 46 g. of CTB–Asp(NH₂)–Ala–Phe–Ile–NHNH₂ (melting point 260° with decomposition; $[\alpha]_D^{22}=-34°$ in 95% acetic acid) result.

Procedure 5: H–Asp(NH₂)–Ala–Phe–Ile–Gly–Leu–Met–NH₂

46 g. of CTB–Asp(NH₂)–Ala–Phe–Ile–NHNH₂ are dissolved in 600 cc. of dimethyl formamide and 160 cc. of a 2 N hydrochloric acid at −5°, 90 cc. of a 1 N sodium nitrite solution and after 7 minutes 45 cc. of triethylamine and 34 g. of H–Gly–Leu–Met–NH₂ acetate (see procedure 3) are added. The mixture is left to stand for 4 days at 20°, evaporated in a vacuum, the residue washed with ether, cold dilute hydrochloric acid and warm methanol. 46 g. of CTB–Asp(NH₂)–Ala–Phe–Ile–Gly–Leu–Met–NH₂ (melting point 260° with decomposition;

$$[\alpha]_D^{21} = -34°$$

in 95% acetic acid) result and are dissolved in 1000 cc. of trifluoro acetic acid. After 2 hours at 20° the mixture is evaporated in a vacuum, the residue washed with ethyl ether, dissolved in 3000 cc. of water, the mixture brought to a pH value of 9–10 by the addition of a 2 N sodium hydroxide solution and the formed precipitate filtered off and then washed with water. 33 g. of H–Asp(NH₂)–Ala–Phe–Ile–Gly–Leu–Met–NH₂ (melting point 230° with decomposition; $[\alpha]_D^{22} = -38°$ in 95% acetic acid) result.

Procedure 6: H–Asp(OH)–Ala–Phe–Ile–Gly–Leu–Met–NH₂

30 g. of H–Asp(NH₂)–Ala–Phe–Ile–Gly–Leu–Met–NH₂ are treated for 24 hours at 20° with a mixture of 50 cc. of a 1 N sodium hydroxide solution and 200 cc of pyridine whilst stirring. The mixture is evaporated in a vacuum, 600 cc. of water added, the mixture filtered and brought to a pH value of 6 by the addition of dilute acetic acid and the formed precipitate filtered off. 20 g. of H–Asp(OH)–Ala–Phe–Ile–Gly–Leu–Met–NH₂ having the characteristics given in procedure 3, result.

What is claimed is:

1. A peptide selected from the group consisting of L-aspartyl-L-alanyl-L-phenylalanyl-L-isoleucyl-glycyl - L-leucyl-L-methionine amide, L-asparaginyl-L-alanyl - L-phenylalanyl-L-isoleucyl-glycyl-L-leucyl - L - methionine amide and their acid addition salts.

2. L-aspartyl-L-alanyl-L-phenylalanyl-L-isoleucyl-glycyl-L-leucyl-L-methionine amide.

3. L-asparaginyl-L-alanyl-L-phenylalanyl-L-isoleucyl-glycyl-L-leucyl-L-methionine amide.

References Cited by the Examiner
UNITED STATES PATENTS

| | | | |
|---|---|---|---|
| 2,953,558 | 9/1960 | Darlington | 260—112 |
| 2,986,573 | 5/1961 | Topliss | 167—65 |
| 2,987,442 | 6/1961 | McLean | 167—65 |
| 3,093,627 | 6/1963 | Schwyzer | 260—112 |

WILLIAM H. SHORT, *Primary Examiner.*

FRANK CACCIAPAGLIA, *Examiner.*

P. L. SABATINE, E. C. EDWARDS, H. E. SCHAIN,
*Assistant Examiners.*